United States Patent
Wang et al.

(10) Patent No.: US 12,315,665 B2
(45) Date of Patent: May 27, 2025

(54) COUPLED INDUCTOR WINDING STRUCTURE FOR COMMON-MODE NOISE REDUCTION

(71) Applicant: VIRGINIA TECH INTELLECTUAL PROPERTIES, INC., Blacksburg, VA (US)

(72) Inventors: Shuo Wang, Blacksburg, VA (US); Fred C. Lee, Blacksburg, VA (US); Qiang Li, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 799 days.

(21) Appl. No.: 17/211,975

(22) Filed: Mar. 25, 2021

(65) Prior Publication Data

US 2022/0310303 A1 Sep. 29, 2022

(51) Int. Cl.
*H01F 27/28* (2006.01)
*H01F 27/24* (2006.01)
(Continued)

(52) U.S. Cl.
CPC ......... *H01F 27/2804* (2013.01); *H01F 27/24* (2013.01); *H01F 27/34* (2013.01);
(Continued)

(58) Field of Classification Search
CPC ...... H01F 27/2804; H01F 27/24; H01F 27/34; H01F 17/0006; H01F 17/04;
(Continued)

(56) References Cited

U.S. PATENT DOCUMENTS

2008/0218300 A1* 9/2008 Loef ............... H01F 27/10 336/200
2008/0247195 A1* 10/2008 Nakahori ............ H02M 7/003 363/20

(Continued)

OTHER PUBLICATIONS

J. C. Crebier and J. P. Ferrieux, "PFC full bridge rectifiers EMI modeling and analysis-common mode disturbance reduction," IEEE Trans. Power Electron., vol. 19, No. 2, pp. 378-387, Mar. 2004.

(Continued)

*Primary Examiner* — Mang Tin Bik Lian
(74) *Attorney, Agent, or Firm* — Thomas | Horstemeyer, LLP

(57) ABSTRACT

Various examples of systems and methods for a coupled inductor winding structure for common-mode noise reduction is described herein. The coupled inductor structure can include a magnetic core including a first leg, a second leg, and a center leg; and a planar winding structure. The planar winding structures can include a first inductor winding for a forward path of a first phase of a power converter; a second inductor winding for a forward path of a second phase of the power converter; a third and fourth inductor winding for a return path. The third inductor winding having at least one turn interleaved within the number of first leg turns of the first inductor winding and configured to achieve unity coupling. The fourth inductor winding having at least one turn interleaved within the number of second leg turns of the second inductor winding and configured to achieve unity coupling.

20 Claims, 17 Drawing Sheets

(51) Int. Cl.
  *H01F 27/34* (2006.01)
  *H01F 17/00* (2006.01)
  *H01F 17/04* (2006.01)
  *H02M 1/00* (2006.01)

(52) U.S. Cl.
  CPC .......... *H01F 17/0006* (2013.01); *H01F 17/04* (2013.01); *H01F 2027/2819* (2013.01); *H02M 1/0064* (2021.05)

(58) Field of Classification Search
  CPC ............. H01F 2027/2819; H01F 37/00; H01F 2027/2809; H02M 1/0064
  See application file for complete search history.

(56) References Cited

U.S. PATENT DOCUMENTS

| | | | | |
|---|---|---|---|---|
| 2010/0232181 | A1* | 9/2010 | Nakahori | H01F 27/2804 336/221 |
| 2014/0313795 | A1* | 10/2014 | Mi | H02M 1/126 333/167 |
| 2017/0294833 | A1* | 10/2017 | Yang | H01F 27/2804 |
| 2017/0330678 | A1* | 11/2017 | Harrison | H01F 3/10 |
| 2018/0226182 | A1* | 8/2018 | Fe | H01F 27/245 |
| 2019/0355506 | A1* | 11/2019 | Fei | H01F 27/2804 |
| 2020/0412272 | A1* | 12/2020 | Raimann | H02M 7/23 |
| 2021/0036619 | A1* | 2/2021 | Murakami | H02M 3/1584 |
| 2021/0375523 | A1* | 12/2021 | Ishizuka | H02M 3/158 |
| 2022/0006394 | A1* | 1/2022 | Jin | H05K 1/181 |
| 2022/0209671 | A1* | 6/2022 | Ye | H02M 1/0095 |

OTHER PUBLICATIONS

B. A. Miwa, D. M. Otten, and M. E. Schlecht, "High efficiency power factor correction using interleaving techniques," in Proc. IEEE Appl. Power Electron. Conf., 1992, pp. 557-568.

D. Cochrane, D. Chen, and D. Boroyevich, "Passive cancellation of common-mode noise in power electronic circuits," IEEE Trans. Power Electron., vol. 18, No. 3, pp. 756-763, May 2003.

S. Lin, M. Zhou, W. Chen, and J. Ying, "Novel methods to reduce common-mode noise based on noise balance," in Proc. IEEE Power Electron. Spec. Conf., 2006, pp. 2728-2733.

Wu X, Poon F, Lee C M, Pong M H, Qian Z, "A Study of Common Mode Noise in Switching Power Supply from a Current Balancing Viewpoint," Proceedings of IEEE PEDS 1999(2):621-625.

M. Shoyama, L. Ge, and T. Ninomiya, "Balanced switching converter to reduce common mode conducted noise," IEEE Trans. Ind. Electron., vol. 50, No. 6, pp. 1095-1099, Dec. 2003.

P. Kong, S. Wang and F. C. Lee, "Common mode EMI noise suppression in bridgeless boost PFC converter," IEEE APEC, 2007, pp. 929-935.

S. Wang, P. Kong and F. C. Lee, "Common Mode Noise Reduction for Boost Converters Using General Balance Technique," IEEE Trans. on Power Electron., vol. 22, No. 4, pp. 1410-1416, Jul. 2007.

Z. Liu, F. C. Lee, Q. Li, and Y. Yang, "Design of GaN-based MHz totem-pole PFC rectifier," in Proc. IEEE Energy Convers. Congr. Expo., Sep. 2015, pp. 682-688.

Z. Liu, Z. Huang, F. C. Lee, and Q. Li, "Digital-based interleaving control for GaN-based MHz CRM totem-pole PFC," in Proc. IEEE Appl. Power Electron. Conf. Expo. (APEC), Long Beach, CA, USA, Sep. 2016, pp. 1847-1852.

Z. Liu, F. C. Lee, Q. Li, and Y. Yang, " Design of GaN-Based MHz Totem-Pole PFC Rectifier," IEEE Trans. Emerg. Sel. Topics Power Electron., vol. 4, No. 3, pp. 799-807, Sep. 2016.

C. Fei, Y. Yang, Q. Li, and F. C. Lee, "Shielding Technique for Planar Matrix Transformers to Suppress Common- Mode EMI Noise and Improve Efficiency," IEEE Trans. Ind. Electron., vol. 65, No. 2, pp. 1263-1272, Feb. 2018.

X. Huang, Z. Liu, Q. Li, and F. C. Lee, "Evaluation and application of 600 V GaN HEMT in cascode structure," IEEE Trans. Power Electron., vol. 29, No. 5, pp. 2453-2461, May 2014.

X. Huang, F. C. Lee, Q. Li and W. Du, "High-Frequency High-Efficiency GaN-Based Interleaved CRM Bidirectional Buck/Boost Converter with Inverse Coupled Inductor," IEEE Trans. on Power Electron., vol. 31, No. 6, pp. 4343-4352, Jun. 2016.

Z. Liu, X. Huang, M. Mu, Y. Yang, F. C. Lee, and Q. Li, "Design and evaluation of GaN-based dual-phase interleaved MHz critical mode PFC converter," in proc. IEEE ECCE, 2014, pp. 611-616.

Zhang, J. Shao, p. Xu, F. C. Lee and M. M. Jovanovic,, "Evaluation of input current in the critical mode boost PFC converter for distributed power systems," in Proc. IEEE APEC, 2001, pp. 130-136.

Y. Yang, M. Mu, Z. Liu, F. C. Lee, and Q. Li, "Common Mode EMI Reduction Technique for Interleaved MHz Critical Mode PFC Converter with Coupled Inductor," in Proc. IEEE Energy Convers. Congr. Expo., 2015, pp. 233-239.

P. Wong, P. Xu, B. Yang, F. C. Lee, "Performance improvements of interleaving VRMs with coupling inductors, " in Power Electronics, IEEE Transactions on , vol. 16, No. 4, pp. 499-507, Jul. 2001.

P. Wong, Q. Wu, P. Xu, Y. Bo, and F. C. Lee, "Investigating coupling inductors in the interleaving QSW VRM," in proc. IEEE Applied Power Electronics Conference, 2000, pp. 973-978.

\* cited by examiner

Ae2a + 2×Ae2b = Ae2

COUPLED INDUCTOR WINDING STRUCTURE FOR COMMON-MODE NOISE REDUCTION

BACKGROUND

Common mode noise in switching power converters is generally caused by dv/dt over parasitic capacitors between switching nodes to the power ground. To limit common mode interference with other devices, compliance with electromagnetic interference standards is mandatory for most switching power converters in various devices.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
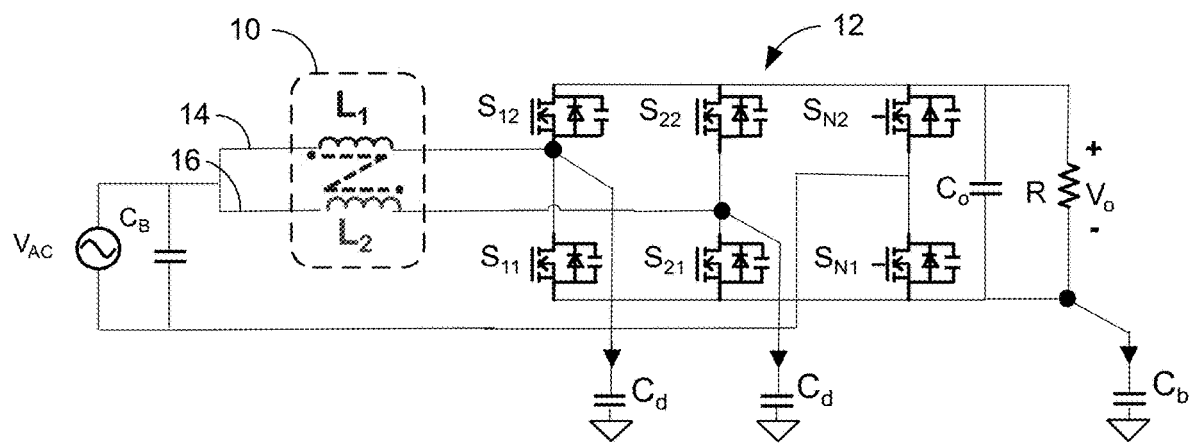
FIG. 1 illustrates an example of a two-phase interleaved totem-pole power factor correction (PFC) converter with an inverse coupled inductor according to various embodiments described herein.

As noted above, common mode (CM) noise in switching power converters is generally caused by dv/dt over parasitic capacitors between switching nodes to the power ground. To limit interference with other devices, compliance with electromagnetic interference (EMI) standards is mandatory for most switching power converters. As a result, an EMI filter may be needed to attenuate the noise level of switching power converters to be less than a noise standard specification over a specified frequency range. In order to achieve high power density and high efficiency, efforts have also been made to reduce EMI filter size and also reduce the EMI noise emission in power factor correction (PFC) converters, among other types of power converters.

A general cancellation winding technique can be used in order to generate a cancellation current to reduce the total CM noise. It is implemented by forming an inverse coupled 1:1 turns ratio winding, utilizing the original inductor in the power stage and introducing another same inductor. As such, the general cancellation winding technique is a relatively bulky and lossy solution. In another approach, a symmetry technique uses one inductor that is equally split into two parts, instead of introducing a same size inductor. In this way, the total inductor size is not increased. However, additional components, e.g. diodes and capacitors, are needed in order to form a symmetric circuit, resulting in extra losses and cost.

To overcome these issues, a coupled inductor winding structure for common-mode noise reduction is described herein. A balance concept can be introduced into a PFC circuit to have a simpler and more effective way to reduce CM noise in a PFC converter. Based on a Wheatstone bridge model, the balance condition is to have the balanced impedances, such that $Z_1/Z_2=Z_3/Z_4$, as described in further detail below. As a result, the voltage potential at point A is equal to that of point B, and current between these two points, which is regarded as the common mode current, is equal to zero.

To implement the balance principle in a PFC circuit, a small inductor can be employed in the return path for a bridgeless PFC converter. Further measures to improve the high frequency balance effectiveness have been conducted by coupling the two inductors, with one in the forward path and another one in the return path. The measurement results indicate that the low frequency CM noise is well attenuated by 20 dBuV, however the high frequency noise may not be effectively reduced due to the uncontrollable parasitics, e.g. equivalent parallel capacitor (EPC) and equivalent parallel resistor (EPR), with conventional litz wire based magnetics.

With recent advances in Gallium Nitride (GaN) power devices, it has been demonstrated that an increase of switching frequency by a factor of 10-20 is possible without compromising efficiency. GaN devices are capable to operate at a frequency 2× to 3× above their Silicon counterparts without incurring additional switching related losses. However, if a buck converter is operated at the critical conduction mode (CRM) to achieve zero-voltage switching (ZVS), there is no turn-on loss, and only very small turn off loss and driver loss. With CRM operation, the switching losses of GaN devices at 500 kHz are negligible. This property is remarkably in contrast to Silicon-based design. In Silicon-based design, the CRM operation is a debatable preferred choice since ZVS is realized at the expense of increased turn-off loss and conduction loss.

Furthermore, with the ability to increase the switching frequency by one order of magnitude, complicated magnetics structures can be simplified as integrated magnetics with embedded PCB windings, suitable for automation. The end result is a product with a significant improvement in density, manufacturability, and much better controllability of parasitics.

However, with faster switching speed in GaN devices, dv/dt at the switching nodes is higher compared to Silicon devices, and higher common mode (CM) noise amplitude has been observed. It would be difficult to suppress high frequency CM noise with conventional litz wire magnetics due to uncontrollable parasitics, e.g. equivalent parallel capacitor (EPC). But with a PCB based winding structure, it is possible to realize better CM noise reduction in balance technique.

A PCB based coupled inductor structure for multi-phase PFC can achieve good AC interleaving with lower winding loss, but with the tradeoff of reduced coupling between inductors in the forward and return paths. As a result, the CM noise is reduced by 20 dBuV inside 10 MHz. However, from 10 MHz to 30 MHz, the CM noise reduction is still ineffective.

The low frequency noise (<10 MHz) can be reduced effectively using several other techniques. However, the CM noise above 10 MHz rarely has the same reduction effectiveness as that in the low frequency range. It is questionable whether an EMI filter can be relied upon to handle high frequency noise, since the insertion gains of EMI filters at high frequency are also strongly related to parasitics, which are hard to control with conventional litz wire CM chokes. Therefore, it is desirable to have uniform CM noise reduction in the whole frequency range from 150 kHz-30 MHz on the power stage.

Thus, there are still remaining issues for balance technique with both conventional litz wire inductors and PCB inductors. First, the inductance in return path should be as small as possible in order to have a ground loop resonant frequency above 30 MHz. With Silicon device based PFC converters, the switching frequency is generally in the range of 60 kHz-140 kHz. The inductor value in the return path is too large to have a ground loop resonant frequency above 30 MHz, even with only one turn. Therefore, a higher switching frequency is necessary.

Second, strong coupling between inductors in the power stage forward path and return path is important for reducing high frequency CM noise. In the conventional Silicon based PFC circuit, with tens turns of inductor in the forward path and a single turn of inductor in the return path, the coupling between the two inductors is typically not strong enough. On the other hand, in a GaN based converter, although the turns number has been reduced significantly, the winding structure needs special efforts to be designed in order to have good balance effect in high frequency range.

To overcome the aforementioned limitations, various examples of systems and methods for a coupled inductor winding structure for common-mode noise reduction is described herein. A PCB winding based negative coupled inductor can address ripple cancellation, among a number of other improvements.

One drawback of a CRM PFC rectifier is the high current ripple, which leads to not only higher conduction loss but also a higher differential mode (DM) noise in comparison with the continuous conduction mode (CCM) PFC rectifier. To address this issue, a two-phase interleaving structure can be used to effectively reduce the DM noise by taking advantage of the ripple cancellation effect.

FIG. 1 illustrates an example of a coupled inductor 10 in a two-phase interleaved totem-pole PFC converter 12. Parasitic capacitors between switching node to ground ($C_d$), and between output trace to ground ($C_b$) are also shown. In this example, $L_1$ is positioned in the forward path of the first phase 14 and $L_2$ is positioned in the forward path of the second phase 16 and have an inverse coupling. While a totem-pole converter is used as an example of a PFC converter herein, the coupled inductor winding structure for common-mode noise reduction can be relied on for other power converter topologies, such as buck converters, boost converters, other PFC converters, and the like.

Figure 2:
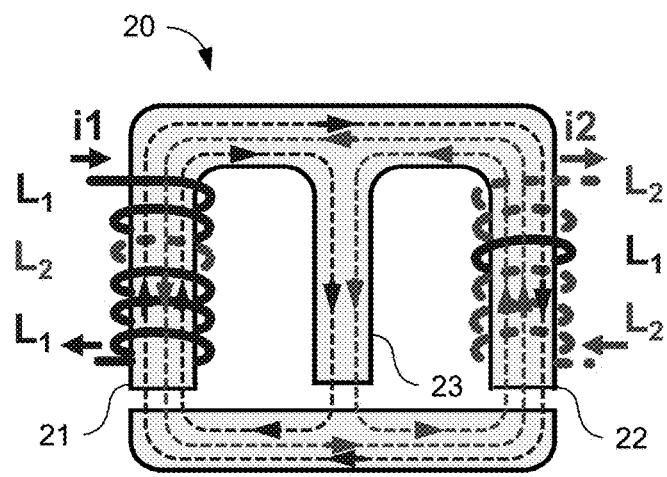
FIG. 2 illustrates an example of a negative coupled inductor according to various embodiments described herein.

FIG. 2 illustrates an example of a negative coupling inductor 20. This concept has been used in multi-phase voltage regulator modules (VRM) to reduce loss and improve transient performance. As shown, the inductors $L_1$ and $L_2$ have windings around the outside legs of an EI core. However, instead of placing the windings of $L_1$ only on the first leg 21, and $L_2$ only on the second leg 22, one turn of the windings for $L_1$ and $L_2$ are interchanged. In other words, at least one winding of $L_1$ is on the same core leg as the windings for $L_2$, and at least one winding of $L_2$ is on the same core leg as the windings for $L_1$. The DC flux generated by the two inductors $L_1$ and $L_2$ has a cancellation effect in the outer legs 21, 22 and an adding effect in the center leg 23. At the same time, the AC flux is added in the outer legs 21, 22 and cancelled in the center leg 23. The negative coupling is intended for several purposes, namely efficiency improvement, improvement of transient response, and higher power density.

According to the embodiments, the concept of the negative coupled inductor 20 shown in FIG. 2 has been extended for use to the coupled inductor 10 shown in FIG. 1, for the two-phase interleaved totem-pole PFC rectifier 12. The inverse coupled mutual inductance M is expressed as M=kL, where k is the coupling coefficient.

Figure 3A:
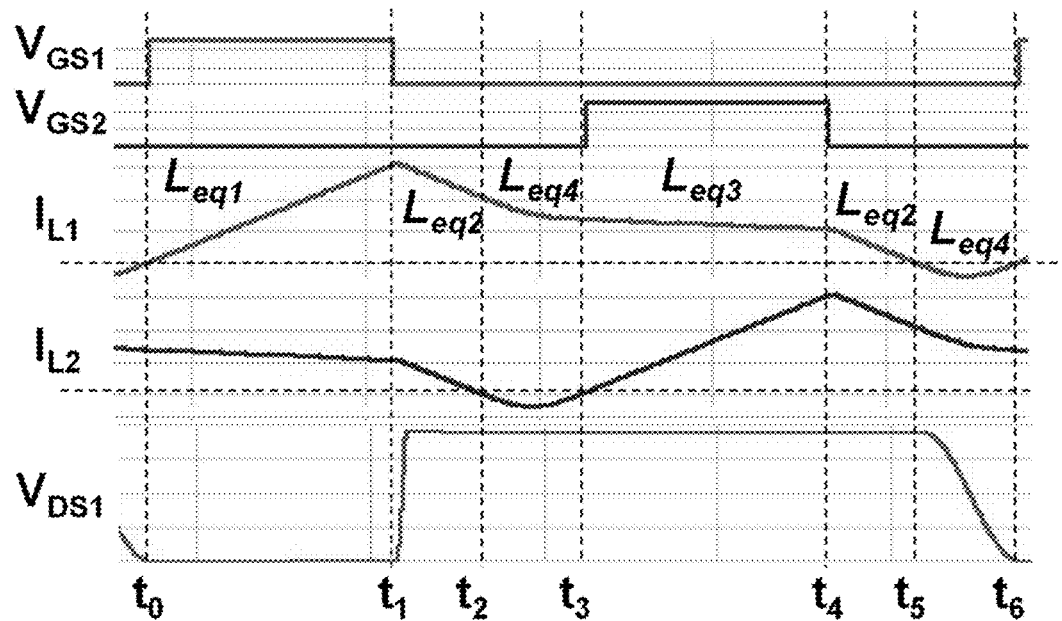
FIG. 3A illustrates example waveforms of critical condition mode (CRM) operation with a negative coupled inductor for the first half of the duty cycle (D<0.5) according to various embodiments described herein.
Figure 3B:
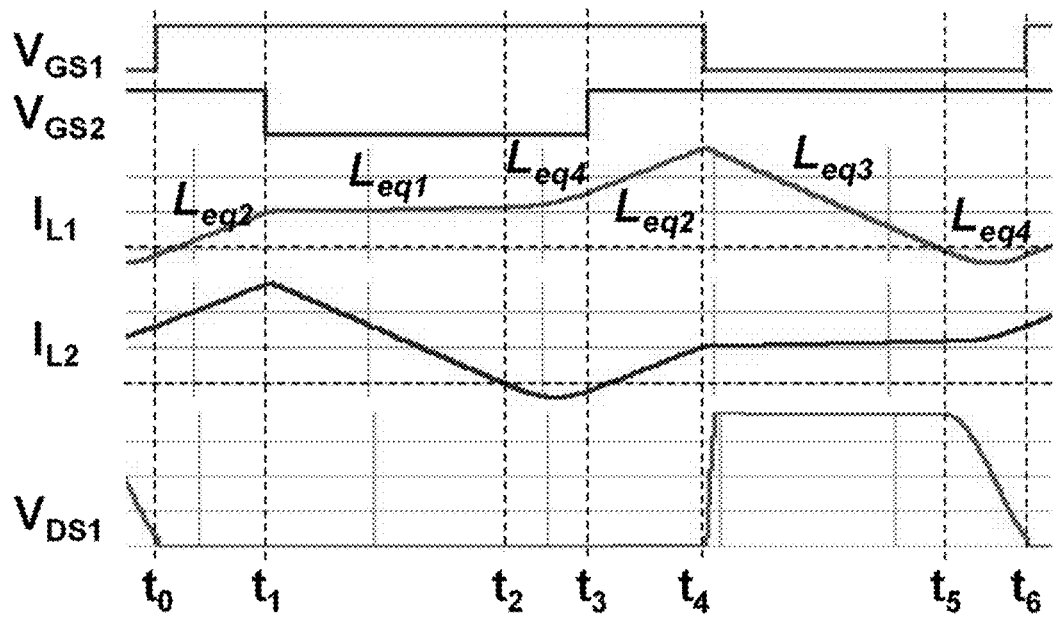
FIG. 3B illustrates example waveforms of CRM operation with a negative coupled inductor for the second half of the duty cycle (D>0.5) according to various embodiments described herein.

Over a line cycle, the condition to achieve ZVS varies as a function of duty cycle D. FIGS. 3A and 3B illustrate examples of key waveforms of CRM operation with negative coupled inductor of the two-phase interleaved totem-pole PFC rectifier shown in FIG. 1, with 50% duty cycle serving as the division line where the different behaviors are exhibited. FIG. 3A shows the $V_{GS1}$, $V_{GS2}$, $I_1$, $I_2$, $V_{DS1}$ for D<0.5 and FIG. 3B shows the $V_{GS1}$, $V_{GS2}$, $I_1$, $I_2$, $V_{DS1}$ for D>0.5. It should be noted that, for CRM operation, ZVS is realized in two resonant periods, namely, $t_2$-$t_3$ for D<0.5 and $t_5$-$t_6$ for D>0.5. The equivalent inductances corresponding to each interval are summarized in Table I.

TABLE I

| Coupled Inductor Equivalent Inductance | | | |
|---|---|---|---|
| $L_{eq1}$ | $L_{eq2}$ | $L_{eq3}$ | $L_{eq4}$ |
| $\dfrac{L^2 - M^2}{L + \dfrac{D}{D'}M}$ | (L + M) | $\dfrac{L^2 - M^2}{L + \dfrac{D'}{D}M}$ | $L - \dfrac{M^2}{L}$ |

For MHz operation, the ability to achieve ZVS is more important. Furthermore, the resonant period, established by the inductor and device junction capacitors to realize ZVS, is no longer negligible at 1 MHz.

Figure 4:
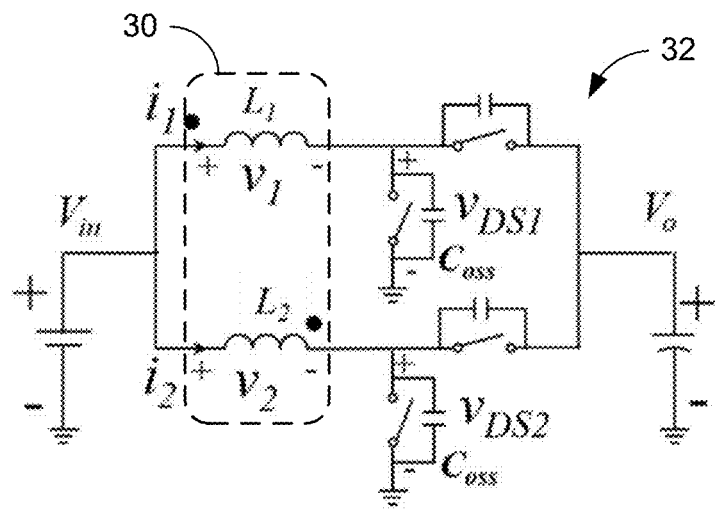
FIG. 4 illustrates an example of an interleaved boost converter with an inverse coupled inductor according to various embodiments described herein.

FIG. 4 illustrates an example of an interleaved boost converter 32 with inversed coupled inductor 30. This simple case of a two-phase interleaved boost DC/DC converter 32 can be used as an example to explain the benefits of coupled inductors 30 for the two-phase PFC. The two self-inductances are considered to be the same ($L_1$=$L_2$=L). As shown in Table I, the equivalent resonant inductance with a coupled inductor is expressed as $L_{eq4}$=L−$M^2$/L, the relation between $L_{eq4}$ and non-coupled inductance $L_{nc}$ can be expressed as $$\begin{cases} L_{eq4} = L_{nc} \cdot \left(1 + \dfrac{D}{D'}k\right) D < 0.5 \\ L_{eq4} = L_{nc} \cdot \left(1 + \dfrac{D'}{D}k\right) D > 0.5 \end{cases} \quad (1)$$

The inverse coupling coefficient k is negative, which means the equivalent resonant inductance of a coupled inductor is always smaller than a non-coupled inductor. Accordingly, the resonant period with a coupled inductor is also reduced as compared to the non-coupled case. This leads to a reduction of circulating loss.

Figure 5:
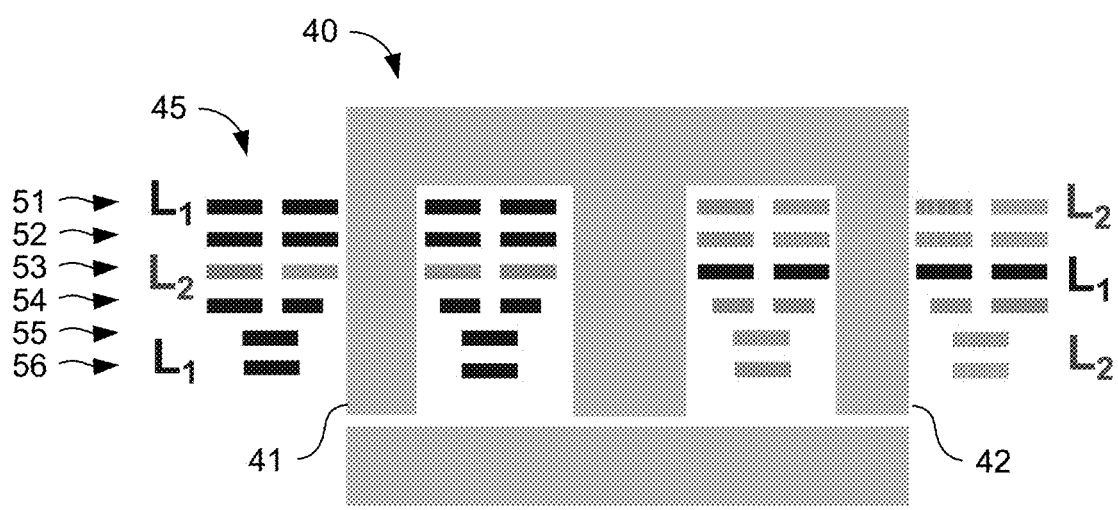
FIG. 5 illustrates an example of a printed circuit board (PCB) winding based coupled inductor structure according to various embodiments described herein.

FIG. 5 illustrates an example of an inductor structure 40 using a six-layer PCB 45 (with layers 51-56) for two-phase interleaved inductors which are negatively coupled. In low voltage point of load applications, PCB winding has been implemented in a transformer design. With interleaved primary and secondary windings, the AC winding loss can be greatly reduced. However, inductors with PCB windings are seldom seen due to large winding losses. The two-phase interleaved inductors which are negatively coupled offers the opportunity to realize a PCB based winding design using a six-layer PCB.

Instead of placing the windings of $L_1$ only on the left leg 41, and $L_2$ only on the right leg 42, windings for $L_1$ and $L_2$ on the third layer 53 are interchanged to provide magnetic field cancellation to some extent. For the last two layers 55, 56, the windings are tapered to avoid fringing flux around the gaps. The bottom two layers have only one turn 55, 56. With the proposed structure, the total loss is about the same as the conventional design using litz wire, with a slightly larger winding loss and smaller core loss. While this example shows a six-layer PCB structure 45, the number of layers of the negatively coupled concept can be scaled up or down. For example, the windings can be implemented on at least one PCB layer.

Figure 6:
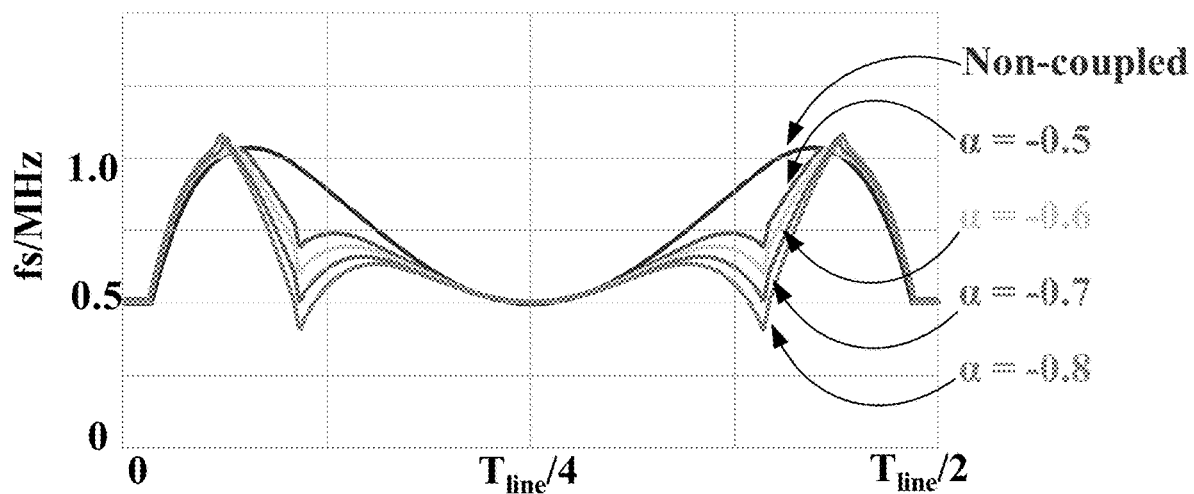
FIG. 6 illustrates an example of switching frequency variance during half a line cycle for the two-phase interleaved totem-pole PFC of FIG. 1, with the PCB winding structure of FIG. 5, according to various embodiments described herein.

FIG. 6 illustrates an example of switching frequency variance during a half line cycle for a two phase interleaved totem-pole PFC. Data is shown for non-coupled and a range of coupling coefficients α=−0.8-−0.5. Another benefit of the coupled inductor in this application is that the effective inductance value can change with the duty cycle, in a manner that the switching frequency will decrease. The net benefit is a reduction in switching loss.

Further limitations can be overcome using a balance technique in PCB coupled inductor winding structure for common-mode noise reduction, as described in various examples herein. When GaN devices are used, one important concern is the potential high EMI noises resulting from high di/dt and dv/dt during switching. While the concern may be a genuine one with the conventional design practice, the use of PCB integrated magnetics offers the opportunity for better reduction of common mode (CM) noises.

Figure 7:
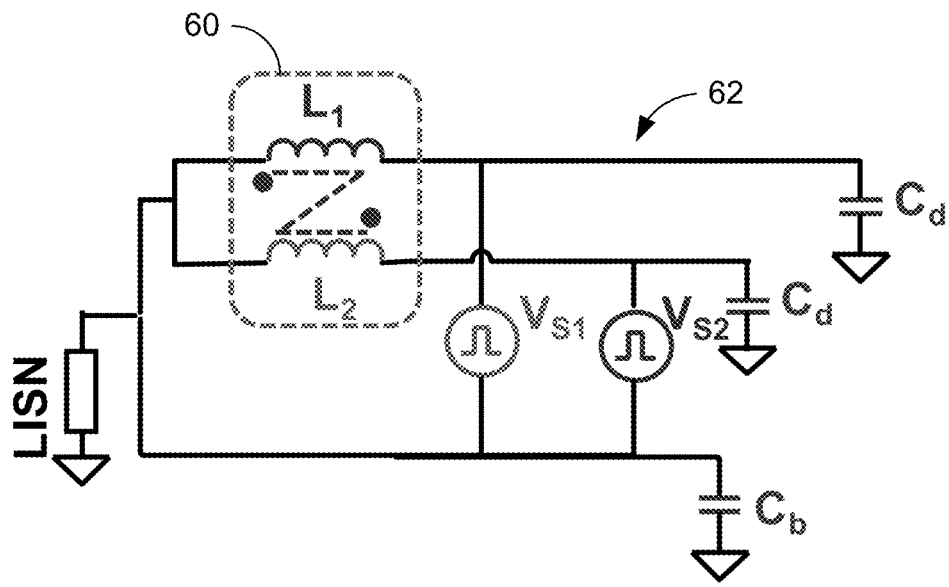
FIG. 7 illustrates a common-mode (CM) noise model for two phase interleaved totem-pole PFC converter of FIG. 1 without balance technique according to various embodiments described herein.
Figure 8:
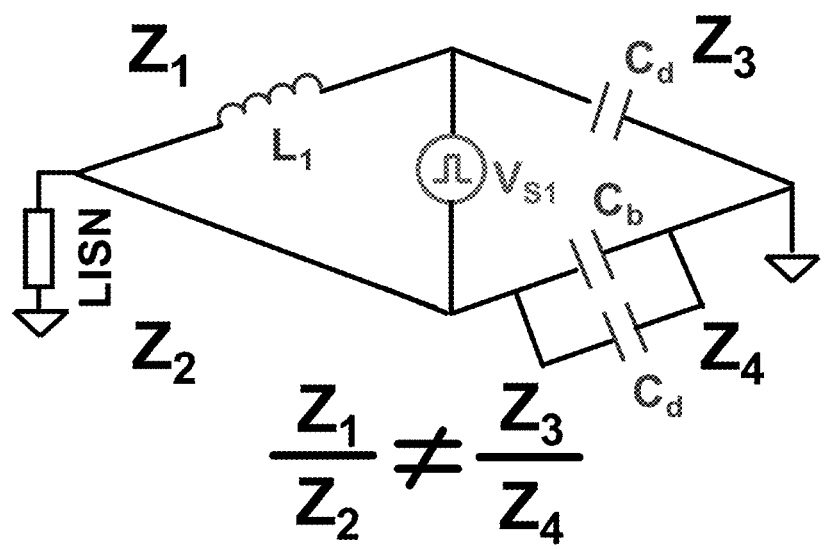
FIG. 8 illustrates a Wheatstone bridge model of phase one of the CM noise model of FIG. 7 according to various embodiments described herein.

FIG. 7 illustrates an example of a CM noise model for coupled inductors 60 in a two phase interleaved totem-pole PFC 62. The two noise sources $V_{s1}$ and $V_{s2}$ represent the CM voltage sources for phase 1 and phase 2 respectively. By applying super position theory, the CM voltage can be analyzed separately. For example, as shown in FIG. 8, a Wheatstone bridge model can represent the impedance $Z_1$, $Z_2$, $Z_3$ and $Z_4$ of each leg respectively for phase 1. In this example, the circuit can not meet the balance condition $Z_1/Z_2=Z_3/Z_4$ since the impedance of $Z_2$ equals to zero.

Figure 9:
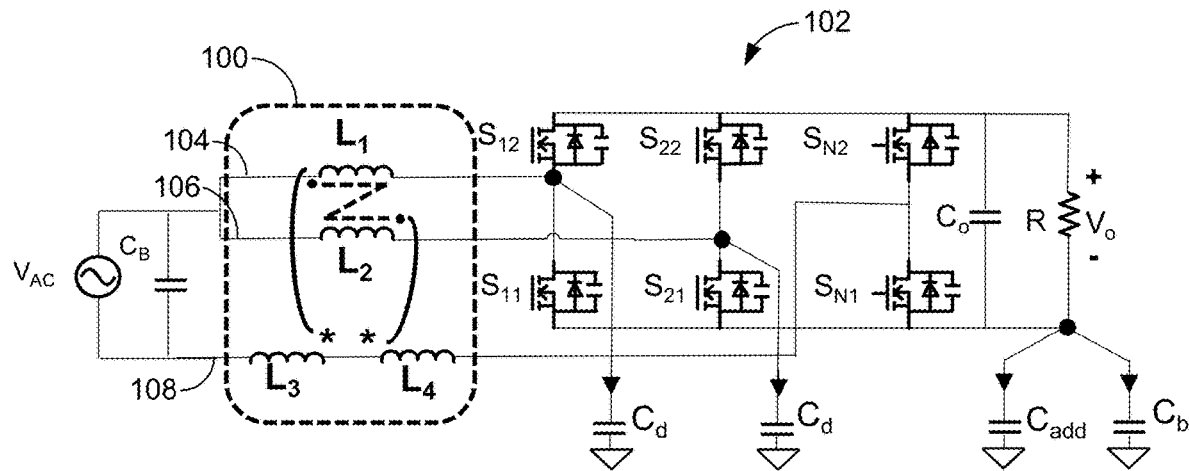
FIG. 9 illustrates an example of a two-phase interleaved totem-pole PFC converter with balance inductors $L_3$ and $L_4$ added according to various embodiments described herein.

FIG. 9 shows a similar totem-pole converter 102 with a balance coupled inductor 100 applied for CM noise reduction. Like FIG. 1, $L_1$ is positioned in the forward path of the first phase 104 and $L_2$ is positioned in the forward path of the second phase 106 and have an inverse coupling. To apply the balance principle for CM noise reduction, another two inductors $L_3$ and $L_4$ are employed in the PFC converter return path 108, as shown in FIG. 9.

Figure 10:
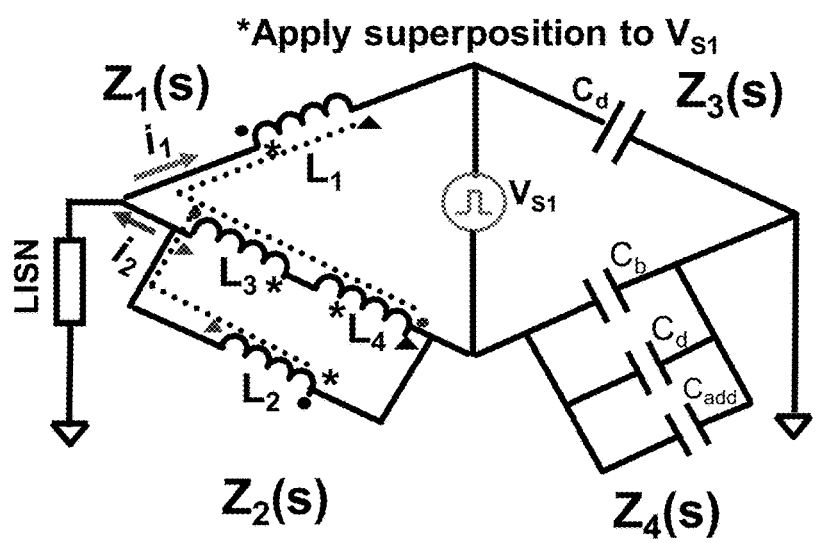
FIG. 10 illustrates a Wheatstone bridge model of phase one of the two-phase interleaved totem-pole PFC converter of FIG. 9 with balance technique by applying super position theory according to various embodiments described herein.

FIG. 10 shows the Wheatstone bridge model for balanced PFC circuit of FIG. 9. It can be noticed that $L_3$ and $L_4$ are in series connected, then paralleled with $L_2$ to form the impedance of $Z_2$. This provides an opportunity to achieve the condition $Z_1/Z_2=Z_3/Z_4$ for a balanced circuit.

Figure 11:
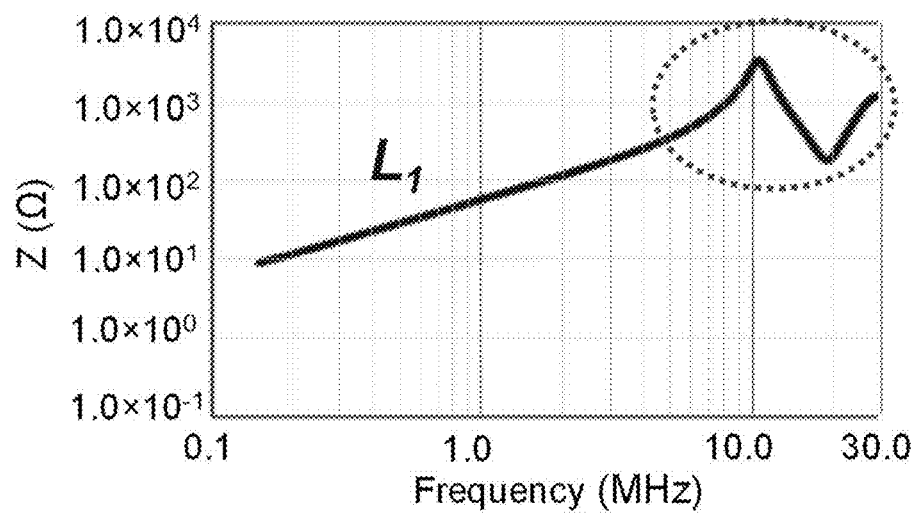
FIG. 11 illustrates an example of measured impedance for inductor $L_1$ of FIG. 9 according to various embodiments described herein.

The impedance of inductor is dominated by inductance at low frequency. However, after the self-resonant frequency, it will be dominated by EPC and EPR. FIG. 11 shows the measured impedance for a single inductor $L_1$. As shown, the impedance is dominated by inductance below the self-resonant frequency of 10 MHz. However, above 10 MHz, the impedance is dominated by self-parasitics EPC and EPR. A second resonant frequency, due to transmission line effect, is indicated with the change in trend at 18 MHz. The impedance ratio is easier to be matched below the self-resonant frequency. However, it is difficult to control parasitic values. Thus the impedance ratio at high frequency is hard to be matched.

Theoretically, a strongly coupled inductor can have good effect in balancing high frequency parasitics. However, with a traditional litz wire based inductor, it is hard to get a uniform coupling between the forward path and return path. This results in ineffective balance in the frequency range of 5-30 MHz.

Figure 12:
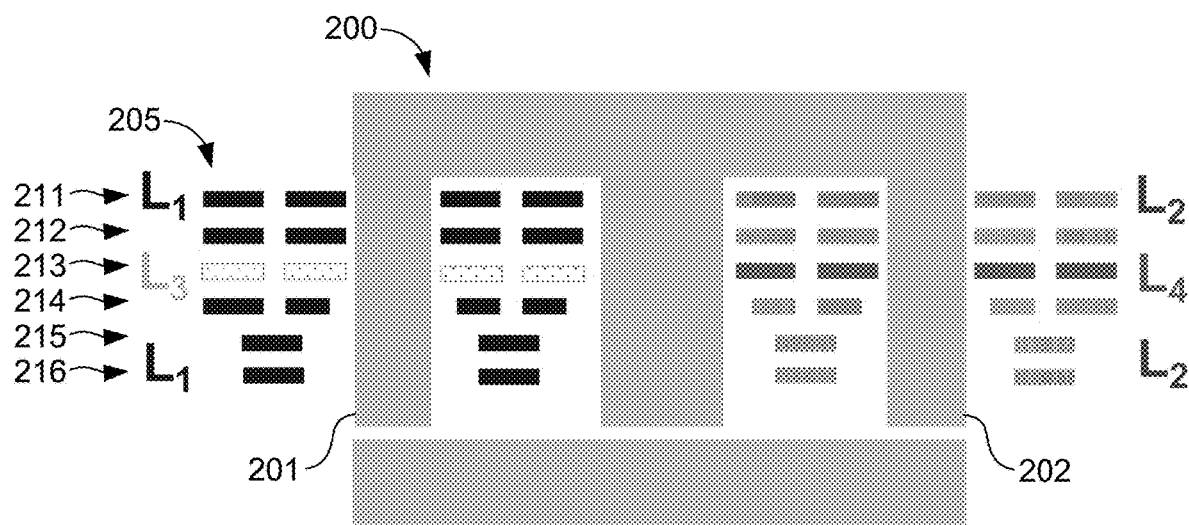
FIG. 12 illustrates an example of a PCB inductor structure with two turn $L_3$ and $L_4$ inductor windings according to various embodiments described herein.

FIG. 12 illustrates an example of a PCB winding structure 205 to enhance the coupling between $L_1$ and $L_3$, and $L_2$ and $L_4$ of the example two-phase interleaved totem-pole PFC converter shown in FIG. 9. In this example, the PCB structure is six-layers 211-216 with magnetic core 200. By simply alternating one layer of $L_1$ and $L_2$ by one layer of $L_3$ and $L_4$, the coupling can be enhanced between inductor $L_1$ and $L_3$, and $L_2$ and $L_4$. In this example, the third layer 213 comprises $L_3$ and $L_4$. Inductors $L_1$ and $L_3$ are arranged in the left hand side leg 201 of the magnetic core 200, while inductors $L_2$ and $L_4$ are placed in the right hand side leg 202. In this way, the coupling between $L_1$ and $L_3$ is approximately unity. At the same time, the winding loss is not compromised since the current in $L_1$ and $L_3$ has an interleaving effect to reduce eddy current loss.

Figure 13A:
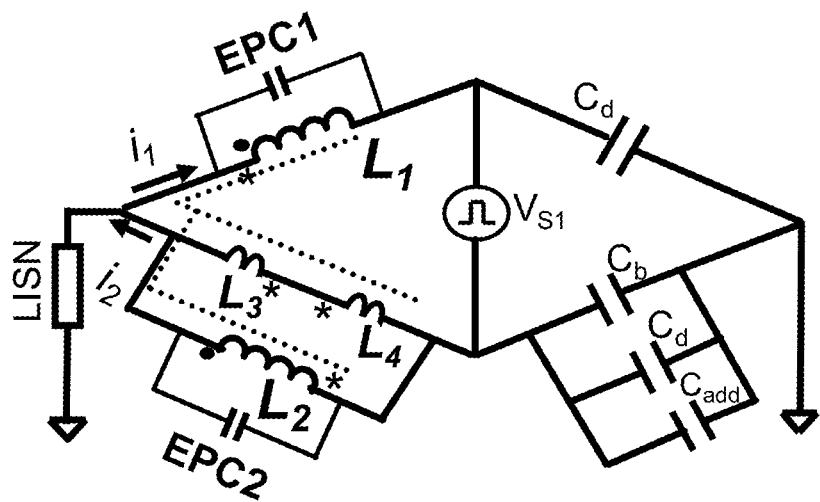
FIG. 13A illustrates an example of a Wheatstone bridge model of FIG. 9 according to various embodiments described herein.
Figure 13B:
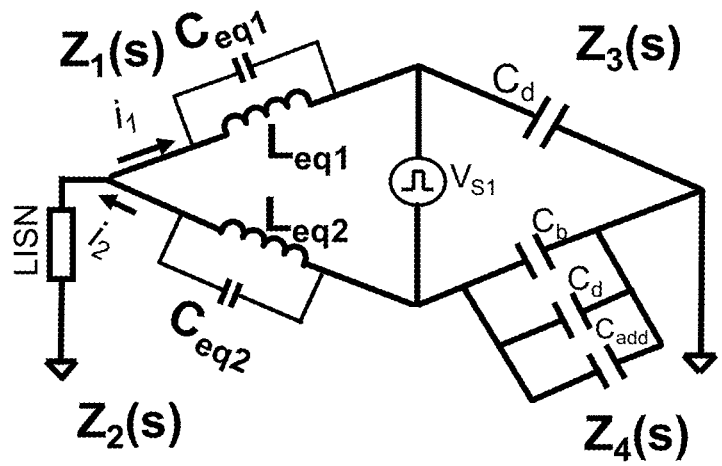
FIG. 13B illustrates an example of an equivalent decoupled Wheatstone bridge model of FIG. 9 according to various embodiments described herein.

FIG. 13A illustrates an example of a Wheatstone bridge model of $V_{s1}$ including the parasitics. With the proposed winding layout, the coupling between $L_1$ and $L_3$, and $L_2$ and $L_4$ can be regarded as unity coupling, which means the coupling coefficient $\alpha_{13}=\alpha_{24}=1$. The balance condition is derived based on the assumptions that the CM current in the line impedance stabilization network (LISN) is zero, which implies that $i_1=i_2$. By a simple derivation, the equivalent decoupled model is shown in FIG. 13B. The impedance in frequency domain are $$Z_1(s) = \frac{sL_{eq1}}{s^2 L_{eq1} C_{eq1} + 1} \quad (2)$$

$$Z_2(s) = \frac{sL_{eq2}}{s^2 L_{eq2} C_{eq2} + 1} \quad (3)$$

The equivalent inductance and capacitance are calculated as $$L_{eq1} = \frac{L_1(1-\alpha_{12}^2)(n+2)(n+1)}{2n + 2\alpha_{12} + n^2 + 2n\alpha_{12} + 2} \quad (4)$$

$$L_{eq2} = \frac{L_1(1-\alpha_{12}^2)(n+2)}{2n + 2\alpha_{12} + n^2 + 2n\alpha_{12} + 2} \quad (5)$$

$$C_{eq1} = \frac{EPC_1(n^2 + 2n + 2)}{(n+1)(n+2)} \quad (6)$$

$$C_{eq2} = \frac{EPC_1(n^2 + 2n + 2)}{(n+2)} \quad (7)$$

Where n is the turns ratio between $L_1$ and $L_3$. At the same time, the equivalent inductance and capacitance have the following relationship.

$$L_{eq1} C_{eq1} = L_{eq2} C_{eq2} \quad (9)$$

$$\frac{L_{eq1}}{L_{eq2}} = \frac{C_{eq2}}{C_{eq1}} = n+1 \quad (10)$$

Therefore the balance condition is always met.

$$\frac{Z_1}{Z_2} = \frac{Z_3}{Z_4} = n+1 \quad (11)$$

The added capacitor $C_{add}$ is a small ceramic capacitor added between output trace to ground in order to do fine tuning of the impedance ratio, as shown for example in FIG. 9. In some examples, the added capacitor $C_{add}$ can be between one or more output traces to ground. In some examples, the added capacitor $C_{add}$ can be between one or more switching modes to ground.

Figure 14:
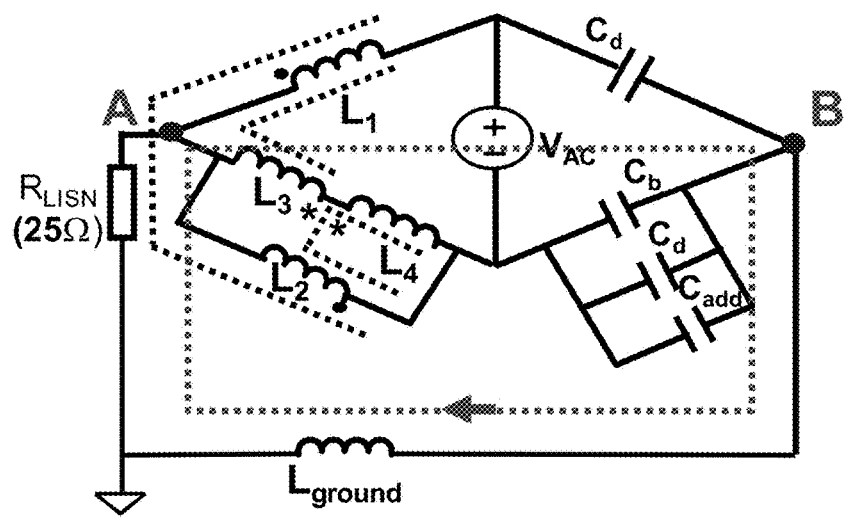
FIG. 14 illustrates an example a ground resonant loop model for the PFC converter of FIG. 9 according to various embodiments described herein.

FIG. 14 illustrates an example of a ground resonant loop in PFC converter. The ground resonant loop is naturally formed including the PFC inductor, parasitic capacitors, and ground loop inductance. At the ground loop resonant frequency, the impedance of the ground loop is quite small. Even a small voltage potential between point A and point B can cause large CM current.

In order to avoid the ground loop resonant impact at frequencies less than 30 MHz, the inductors and capacitors in the ground loop should be as small as possible. Since the capacitors $C_b$, $C_d$ and $C_{add}$ are strongly related to the layout of PCB and converter, it is hard to further reduce these values. Also, the ground loop inductance is difficult to control. The only component that can be easily modified is the inductance value. Therefore, the balance inductor $L_3$ and $L_4$ need to be as small as possible. This is implemented by replacing the two turn winding with one turn for $L_3$ and $L_4$.

Figure 15:
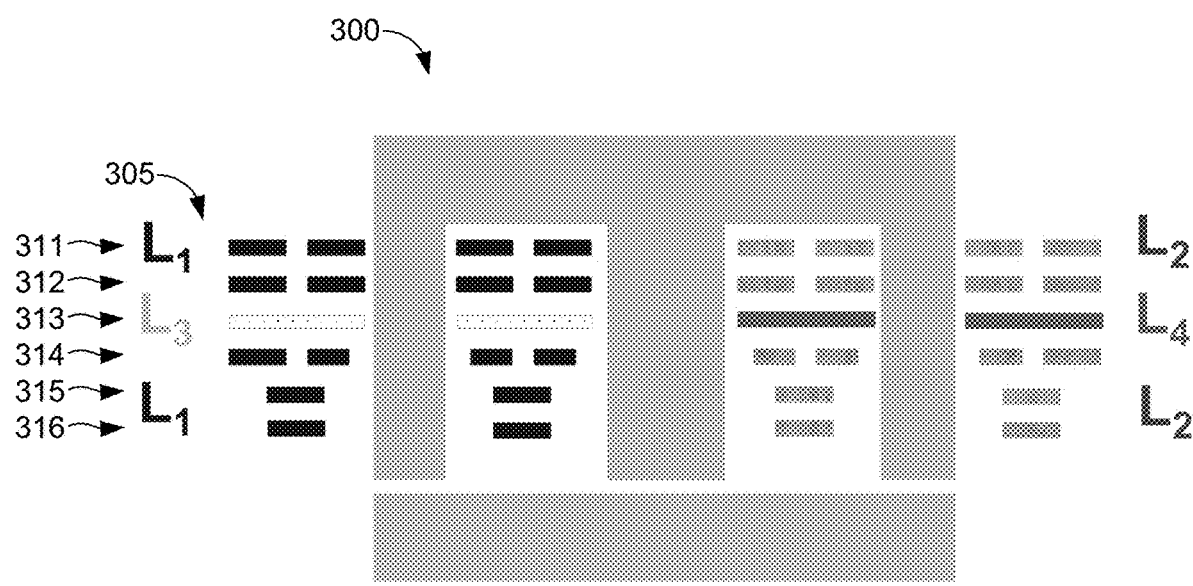
FIG. 15 illustrates an example of a PCB inductor structure with one turn $L_3$ and $L_4$ according to various embodiments described herein.

This example is shown in FIG. 15, the third layer 313 of the PCB structure 305 has one turn for $L_3$ and $L_4$ compared to the configuration in FIG. 12 with two turns at the third layer 213 for $L_3$ and $L_4$. It has both the benefits of strong coupling between $L_1$ and $L_3$, and $L_2$ and $L_4$, and a reduced impact from ground loop resonant. Therefore, it is expected to have a uniform CM noise reduction in the whole frequency range from 150 kHz to 30 MHz.

Figure 16:
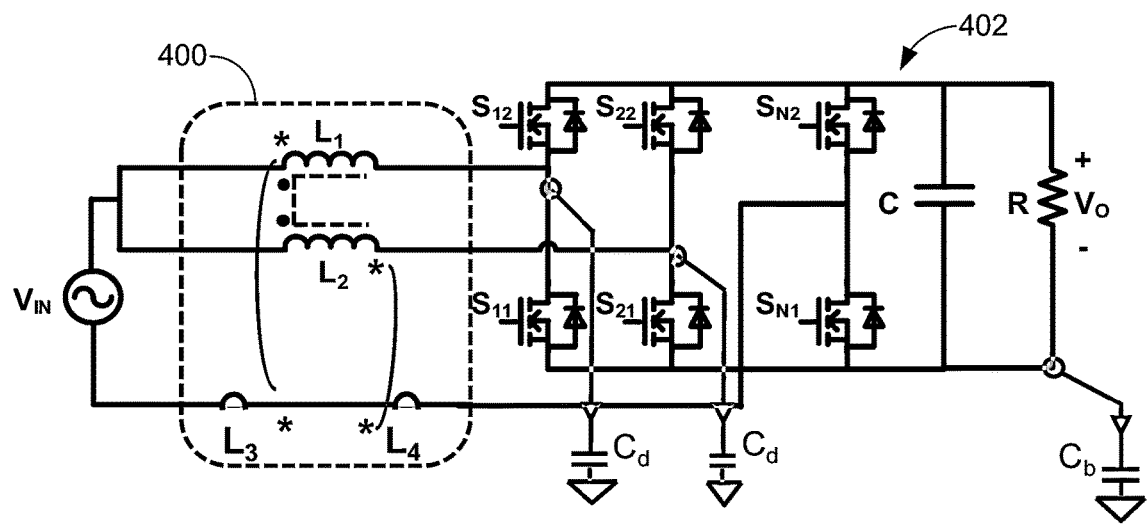
FIG. 16 illustrates an example of a two-phase interleaved totem-pole PFC converter with a variable output voltage according to various embodiments described herein.

Further limitations can be overcome by extending the balance technique to a positive coupled inductor, as described in various examples of systems and methods for a coupled inductor winding structure for common-mode noise reduction. FIG. 16 illustrates an example of balanced coupled inductor 400 in a two-phase interleaved totem-pole PFC converter 402 with a variable output voltage. The negative coupled inductor is preferred when the output voltage of CRM PFC is fixed value since it reduces switching frequency. However, when the output voltage is a variable value, the negative coupled inductor might not be applicable.

Figure 17A:
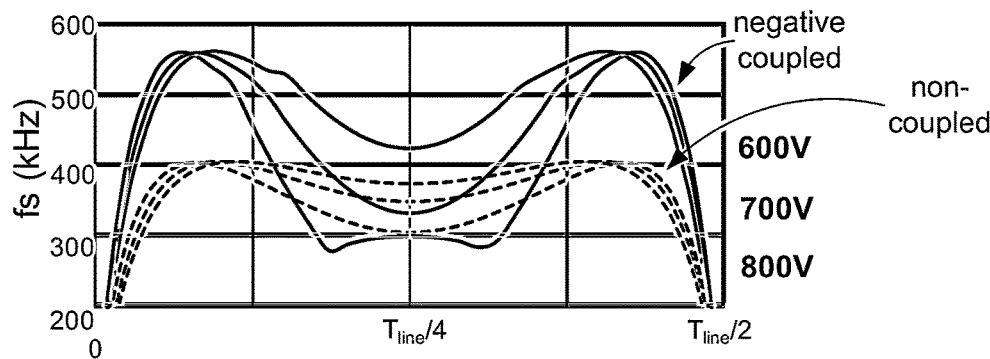
FIG. 17A illustrates an example of the switching frequency over half a line cycle with variable output voltage for CRM for the PFC converter of FIG. 9 with a negative coupled inductor according to various embodiments described herein.
Figure 17B:
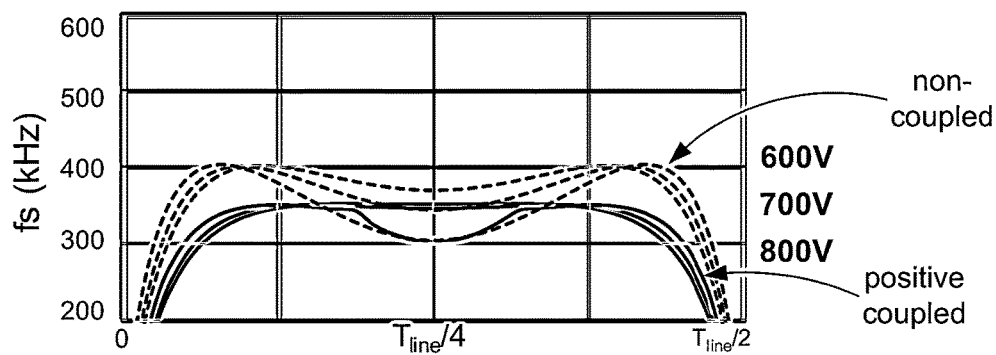
FIG. 17B illustrates an example of the switching frequency over half a line cycle with variable output voltage for CRM for the PFC converter of FIG. 16 with a positive coupled inductor according to various embodiments described herein.

FIGS. 17A and 17B show the switching frequency of the CRM PFC converter 402 when the output voltage is a variable value, with the solid line representing a non-coupled inductor. In FIG. 17A, the switching frequency over a half a line cycle for a negative coupled inductor is shown as compared to a non-coupled inductor. In FIG. 17B, the switching frequency over a half a line cycle for a positive coupled inductor is shown compared to a non-coupled inductor. As shown, the frequency range is increased with the negative coupled inductor as compared with the non-coupled inductor. However, with a positive coupled inductor, the frequency range is reduced. Therefore, positive coupled inductor can be selected for CRM PFC converter when the output voltage is a variable value.

Figure 18:
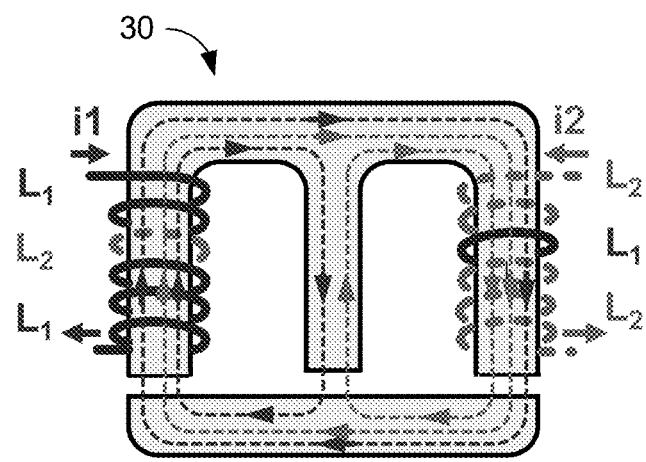
FIG. 18 illustrates an example of a positive coupled inductor according to various embodiments described herein.

FIG. 18 illustrates an example of positive coupling two inductors. Similar to the negative coupling inductors shown in FIG. 2, the inductors $L_1$ and $L_2$ have windings around the outside legs of an EI core 30. The direction of current $i_2$ is opposite of that shown in FIG. 2, which affects the flux. The DC flux add in the outer leg, and cancel each other in the center leg. The AC flux is cancelled in outer legs and added in center leg.

Figure 19A:
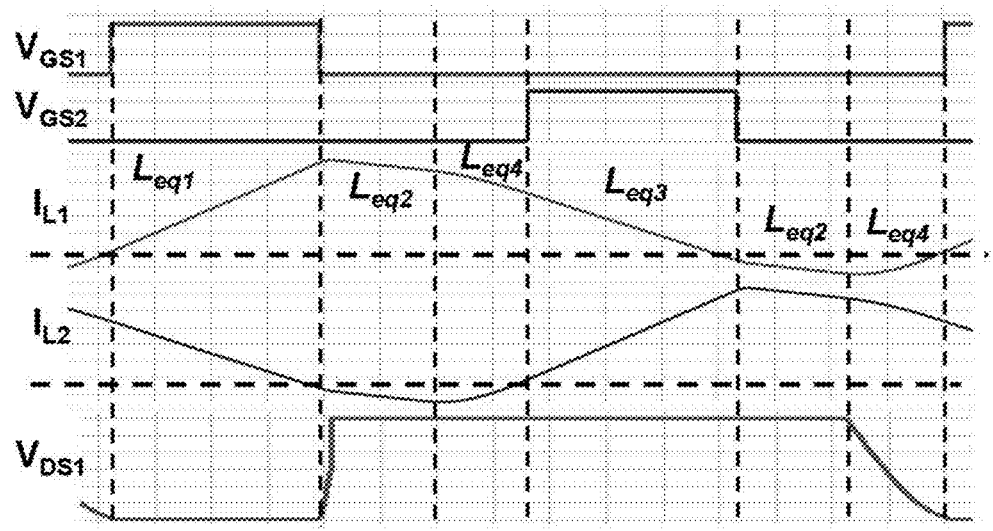
FIG. 19A illustrates an example of key waveforms of CRM operation with a positive coupled inductor for the first half of the duty cycle (D<0.5) according to various embodiments described herein.
Figure 19B:
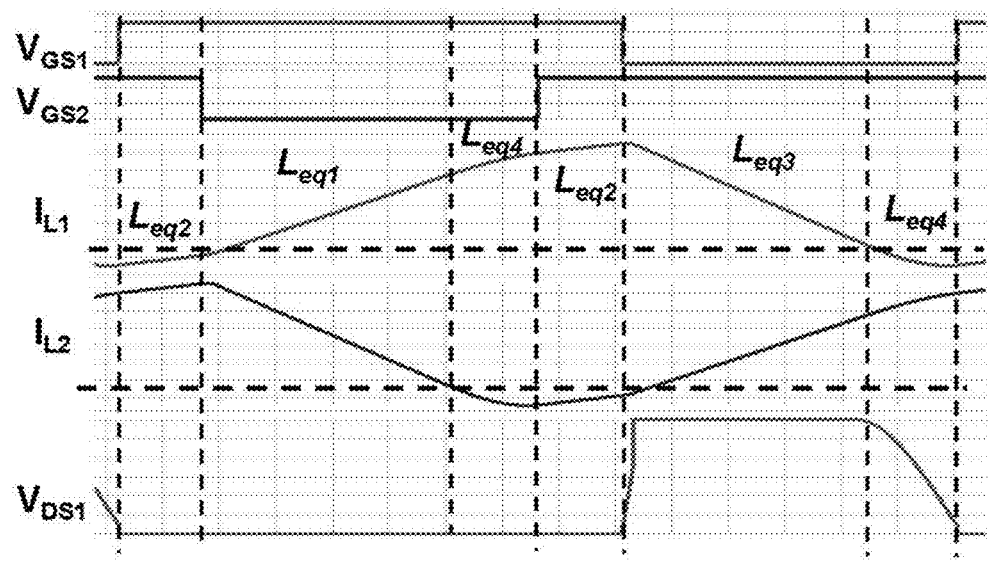
FIG. 19B illustrates an example of key waveforms of CRM operation with a positive coupled inductor for the second half of the duty cycle (D>0.5) according to various embodiments described herein.

FIGS. 19A and 19B illustrate the typical inductor current waveforms of CRM operation for positive coupled inductor over a line cycle, with 50% duty cycle serving as the division line where the different behaviors are exhibited. The equations of the equivalent inductances corresponding to each interval are the same as shown in Table I.

Figure 20:
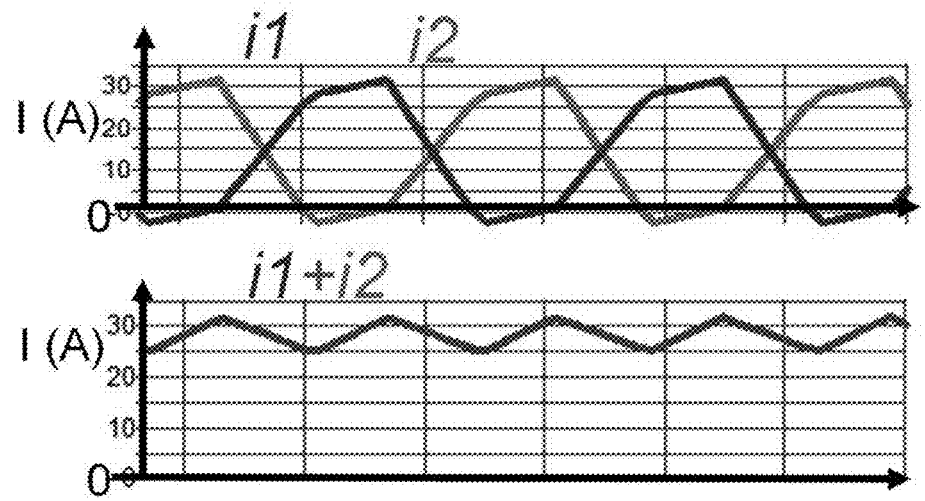
FIG. 20 illustrates an example of inductor current waveforms in positive coupled inductor according to various embodiments described herein.

The PCB winding structure can follow the same layouts as that in the negative coupled inductor for low power applications. However, when the power is pushed to several kW per phase, it is preferred to have only one turn in a single layer in order to reduce PCB winding loss. The inductor current waveforms are shown in FIG. 20, where $i_1$ is the current for $L_1$, $i_2$ is the current for $L_2$, and $i_1+i_2$ is the current for $L_3$ and $L_4$. Since the current in $L_3$ and $L_4$ is two times larger than that in $L_1$ and $L_2$, it is preferrable to use more layers for $L_3$ and $L_4$ in parallel to share the high current in the return path.

Figure 21A:
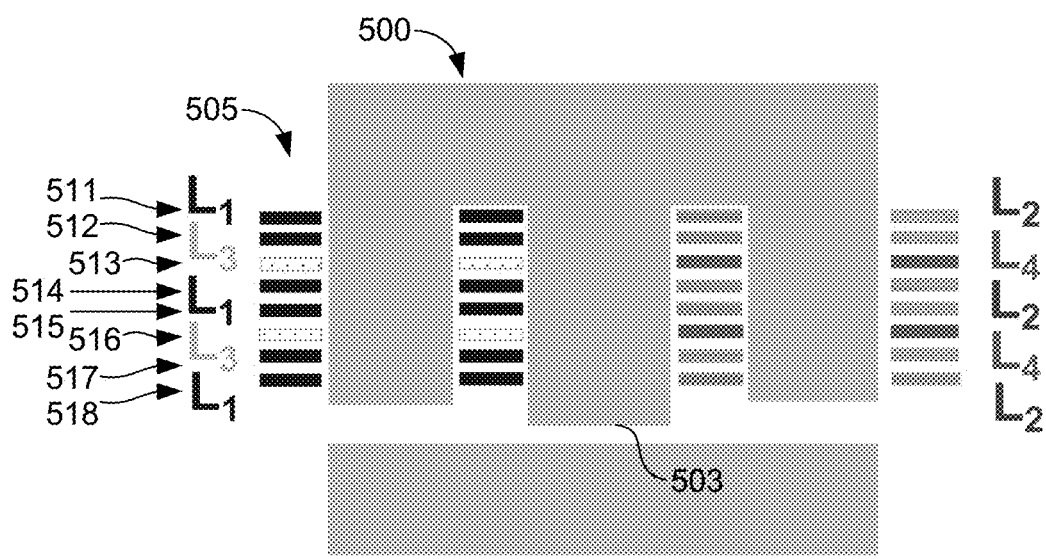
FIGS. 21A and 21B illustrate front and top views, respectively, of an example PCB inductor structure with an EI core according to various embodiments described herein.
Figure 21B:
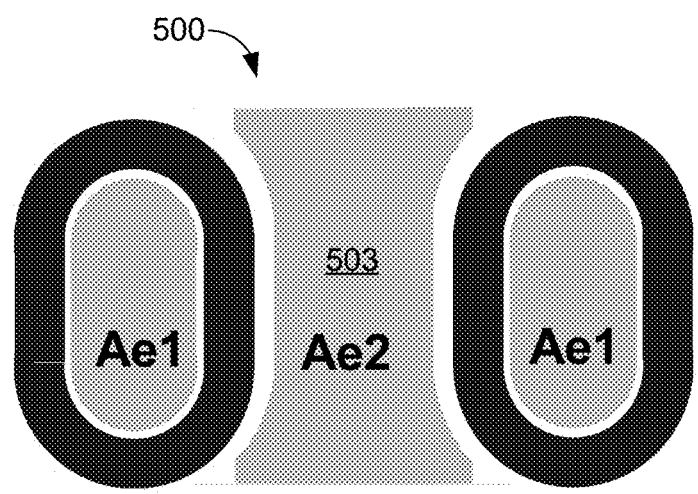

FIGS. 21A and 21B illustrate a balance coupled inductor winding structure 505 using an EI core 500. In this example, eight layers 511-518 are used in the PCB structure 505. $L_3$ and $L_4$ are formed in two layers 513, 516 in parallel to share the high current in the return path. Instead of using a single layer for $L_3$ and $L_4$, two layers are in paralleled in here to reduce winding loss. It should be noted that the layers for $L_3$ and $L_4$ are not limited to two, but can be any number based on the demand. However, it is suggested to parallel the layers to form a single turn inductor for $L_3$ and $L_4$ in order to reduce the impact of ground loop resonance. Since $L_3$ is also part of $L_2$, and La is also part of $L_1$, the interleaving effect remains strong.

Figure 22A:
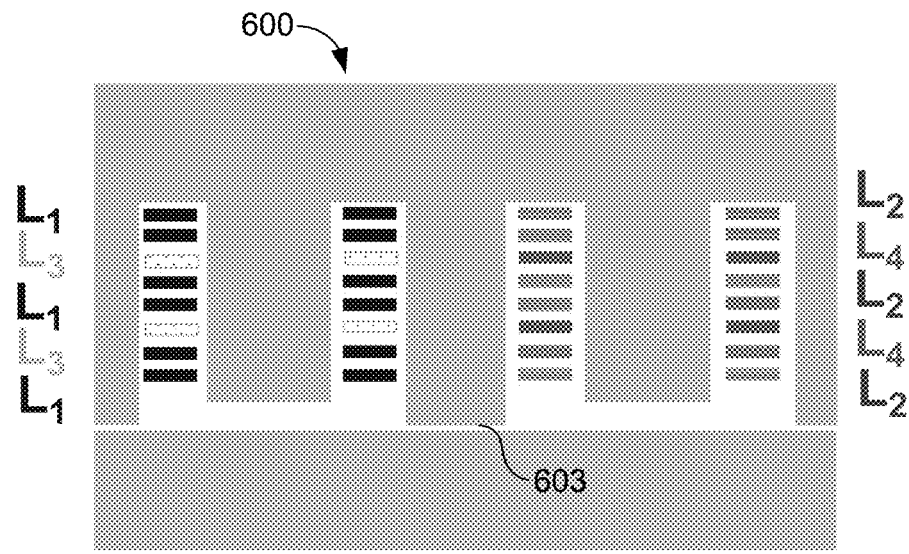
FIGS. 22A and 22B illustrate front and top views, respectively, of an example PCB inductor structure with a PQ core according to various embodiments described herein.
Figure 22B:
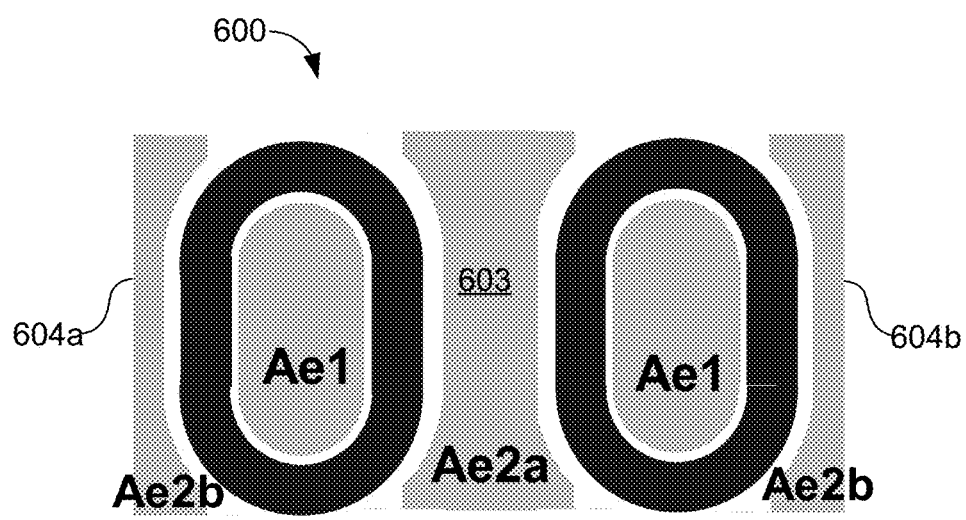

As shown in FIGS. 22A and 22B, the EI core structure can be further modified to build up a PQ core structure by dividing the center leg into three parts. The only difference in structure between the EI core and PQ core is that the middle leg 503 cross section area Ae2 in EI core 500 is now equals to the summation of middle leg 603 and outside legs 604a, 604b (Ae2a and 2×Ae2b) in PQ core 600.

Figure 23A:
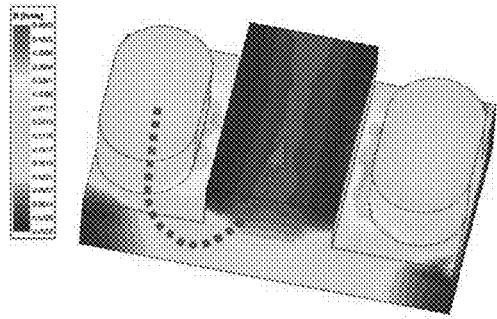
FIG. 23A illustrates an example of the leakage flux path in a coupled inductor based on a 3D finite element analysis (FEA) simulation of the PCB inductor structure with the EI core shown in FIGS. 21A and 21B according to various embodiments described herein.
Figure 23B:
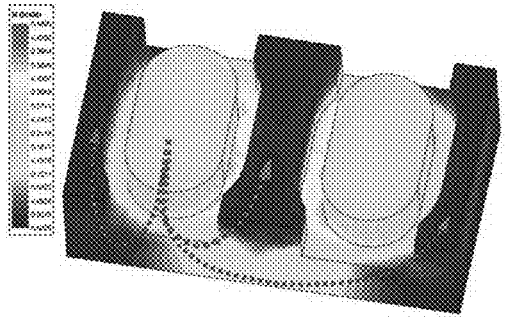
FIG. 23B illustrates an example of the leakage flux path in a coupled inductor based on a 3D FEA simulation of the PCB inductor structure with the PQ core shown in FIGS. 22A and 22B according to various embodiments described herein.
Figure 24A:
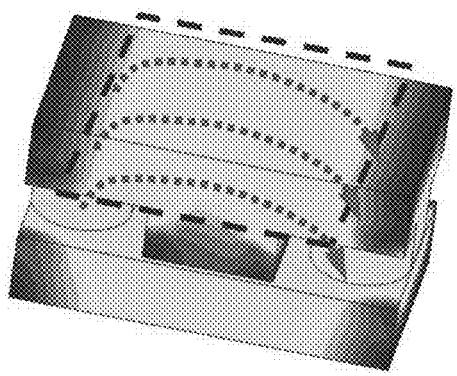
FIG. 24A illustrates an example of the mutual flux path in a coupled inductor based on 3D FEA simulation of the PCB inductor structure with the EI core shown in FIGS. 21A and 21B according to various embodiments described herein.
Figure 24B:
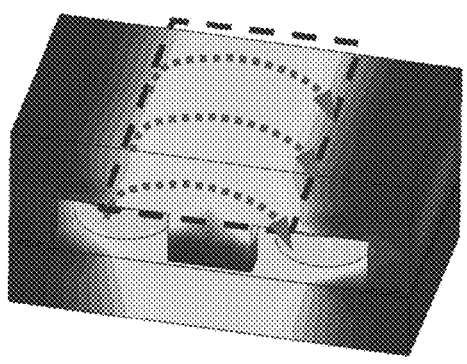
FIG. 24B illustrates an example of the mutual flux path in a coupled inductor based on 3D FEA simulation of the PCB inductor structure with the PQ core shown in FIGS. 22A and 22B according to various embodiments described herein.

FIGS. 23A and 23B illustrate the leakage flux path in a balanced coupled inductor structure based on 3D finite element analysis (FEA) simulation of using an EI core and PQ core, respectively. The PQ core has more evenly distributed leakage flux in the middle and outer legs. FIGS. 24A and 24B illustrate the mutual flux path in a balanced coupled inductor structure based on 3D FEA simulation of using an EI core and PQ core, respectively. The PQ core has shorter flux path and less flux crowding in the plate. Based on FEA simulation results, the PQ core reduces core loss by 15% compared with EI core.

Another benefit of the PQ core structure is that it has a more mechanically stable structure than EI core when the air gaps are non-uniformed. When the center leg air gap is smaller than the outer leg, for example, the EI core is mechanically unstable, which may result in potential unbalance and a safety issue in a switching power supply. However, the proposed PQ core always has a mechanically stable structure that are independent to air gaps. This helps to enhance the reliability of switching power converters.

The effectiveness of the proposed balance inductor structure was verified based on a 1 KW GaN device based two-phase interleaving CRM totem-pole PFC converter with switching frequency 1-3 MHz. For the example structure shown in FIG. 15, a 6 layer PCB (with layers 311-316) was employed to integrate 4 inductors into a single EI core 300. $L_1$ and $L_2$ have 8 turns each, while $L_3$ and $L_4$ have 1 turn each.

Figure 25:
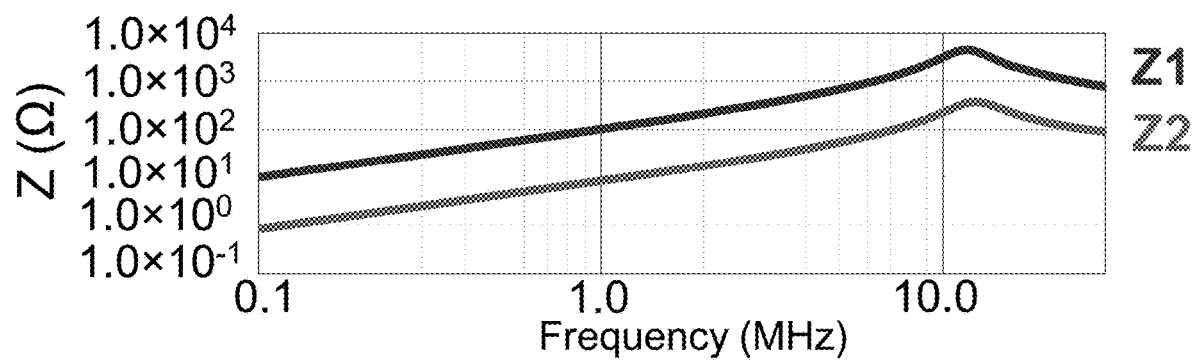
FIG. 25 illustrates example measured impedances of $Z_1$ and $Z_2$ according to various embodiments described herein.

First, the impedance of $Z_1$ and $Z_2$ was measured, as shown in FIG. 25. It shows that the impedance ratio is always fixed even up to 30 MHz. Thus, the balance condition can be met in the whole frequency range with the proposed PCB inductor structure.

Figure 26:
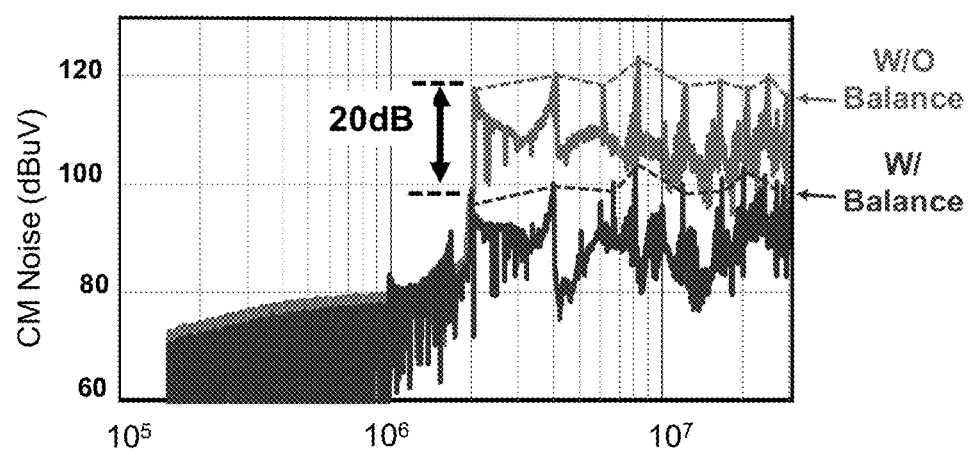
FIG. 26 illustrates a comparison of the measured CM noise with balance and without balance technique according to various embodiments described herein.

FIG. 26 illustrates the CM noise measurement results for a GaN device based totem-pole PFC, shown without the balanced technique and with the balanced EMI noise reduction coupled inductor structure. Applying the balanced EMI noise reduction coupled inductor structure, a reduction of 20 dB uniform CM noise is achieved in the whole frequency range from 150 kHz-30 MHz.

Figure 27:
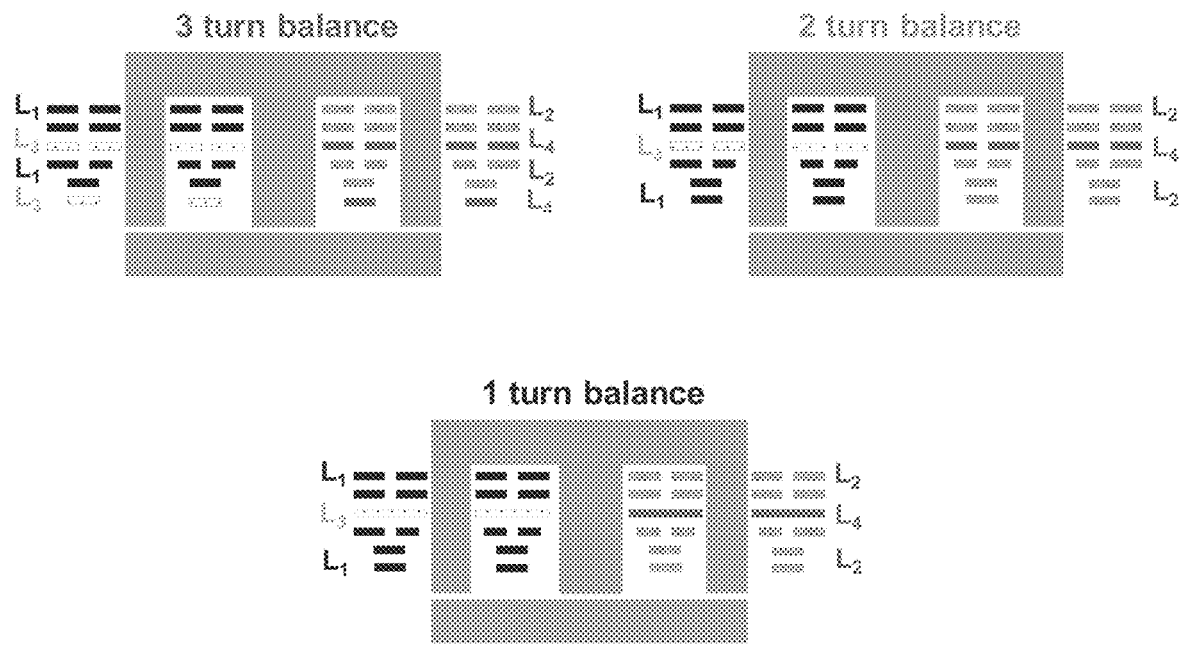
FIG. 27 illustrates three examples of balance winding structures for ground loop impact verification according to various embodiments described herein.

To verify the ground loop impact, the CM noises of three inductor structures with 3 turn, 2 turn and 1 turn $L_3$ and $L_4$ respectively are compared. As shown in FIG. 27, an example 3 turn balance structure is shown as a six-layer inductor structure with three turns of $L_3$ and $L_4$ at the third and sixth layer, is considered case 1. An example 2 turn balance structure is shown as a six-layer inductor structure with two turns of $L_3$ and $L_4$ at the third layer is considered case 2. An example 1 turn balance structure is shown as a six-layer inductor structure with one turn of $L_3$ and $L_4$ at the third layer is considered case 3.

Figure 28:
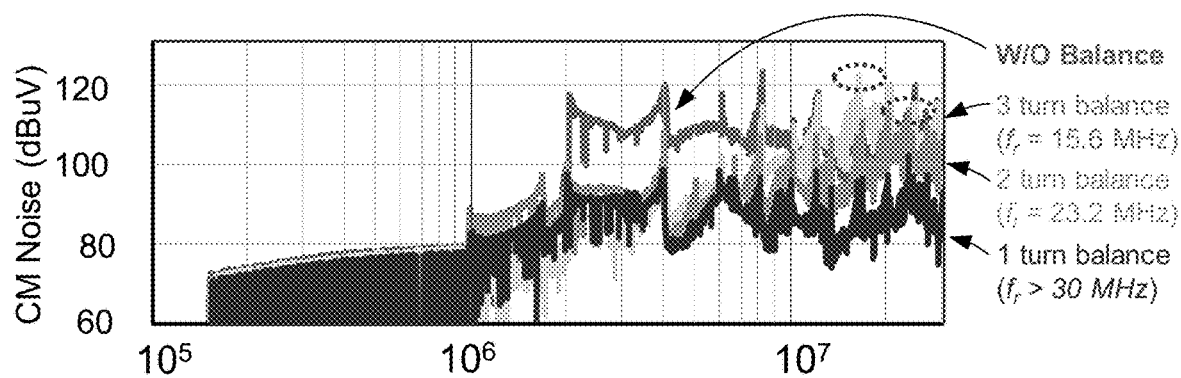
FIG. 28 illustrates an example comparison of the measured CM noise for three examples of FIG. 27 according to various embodiments described herein.

The resulting measured CM noise is graphed in FIG. 28 for each of the three structures of FIG. 27 compared to the CM noise for a structure without balance applied. For case 1 with three turns L3 and L4, there is a CM noise peak at 15.6 MHz due to the ground loop resonant. By reducing the turns of $L_3$ and $L_4$ to two turns, the resonant frequency is pushed to 23.2 MHz in case 2. It is further pushed beyond 30 MHz in case 3 with only one turn balance inductor $L_3$ and $L_4$. Therefore, it is verified that the balance coupled inductor structure with one turn $L_3$ and $L_4$ has a uniform CM noise reduction in the interested frequency range.

In summary, adopting GaN devices in PFC converters, the switching frequency can be increased up to the MHz range, with dramatic improvement in power density without a detriment of efficiency. Furthermore, the inductor value can be reduced dramatically with more opportunities to integrate PCB windings into magnetics. With PCB based winding structures, opportunities for high frequency EMI common mode noise reduction are possible to be realized in a balance technique, which was previously not possible due to uncontrollable parasitics, e.g. equivalent parallel capacitor (EPC). A novel PCB based coupled inductor structure can enhance the high frequency balance effect. CM noise model and balance condition are shown. Moreover, ground loop impacts for high frequency noise described. A two phase interleaved totem-pole PFC converter with GaN device as an example to verify the balance technique. Experimental results show that balance condition is independent to self-resonant frequency of inductor with the PCB balanced coupled inductor structure, and CM noise can be uniformly reduced by 20 dB from 150 kHz up to 30 MHz.

With GaN devices implemented in PFC converters, the switching frequency can be pushed into the MHz range without compromising efficiency. Magnetics previously designed with litz wire can be easily implemented with PCB windings. With PCB based winding structures, opportunities for high frequency EMI common-mode noise reduction, previously inconceivable due to uncontrollable EPC and EPR, is possible to be realized in a balance technique. To enhance the high frequency balance, a novel PCB winding structure in coupled inductor is described. Common mode noise model and balance condition for minimizing CM noise is derived. Moreover, ground loop impacts for high frequency noise are shown and the one turn balance inductor recommended. An example two phase interleaved totem-pole PFC converter with GaN device is modeled to verify the balance technique. Experimental results show that balance condition is independent to self-resonant frequency of inductor with proposed PCB inductor structure, and CM noise can be reduced uniformly up to 20 dB from 150 kHz to 30 MHz.

The integrated magnetics for PFC coupled inductor is also extended to a positive coupling case. A new PQ core structure is proposed as a potential approach for reducing core loss and enhancing inductor stability compared to the conventional EI core. Finite element analysis simulation results verify the benefits of reducing core loss by 15% with the proposed PQ core structure.

The PCB winding inductor structure disclosed herein can be implemented by replacing layers of $L_1$ and $L_2$ by $L_3$ and $L_4$ with no extra losses or price. Although a 1 kW two phase interleaved totem-pole PFC is selected as the design platform, the same approach can also be applied to single-phase or multi-phase PFC converters in a much wider power range.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A coupled inductor structure, comprising:
   a magnetic core comprising a first leg, a second leg, and a center leg; and
   a planar winding structure comprising:
      a first inductor winding connected in a forward path of a first phase of a power converter between a power source connection and switches of the first phase, the first inductor winding having a number of first leg turns;
      a second inductor winding connected in a forward path of a second phase of the power converter between the power source connection and switches of the second phase, the second inductor winding having a number of second leg turns;
      a third inductor winding connected in a return path of the power converter, the third inductor winding having at least one turn interleaved within the number of first leg turns of the first inductor winding; and
      a fourth inductor winding connected in the return path, the fourth inductor winding connected in series with the third inductor winding, the fourth inductor winding having at least one turn interleaved within the number of second leg turns of the second inductor winding,
   wherein the first inductor winding and the third inductor winding are configured to achieve unity coupling and the second inductor winding and the fourth inductor winding are configured to achieve unity coupling.

2. The coupled inductor structure of claim 1, further comprising an added capacitor between an output trace to ground, the added capacitor configured to tune an impedance ratio.

3. The coupled inductor structure of claim 2, wherein, for a balance condition of the coupled inductor structure for the power converter:
   a first impedance comprises the first inductor winding;
   a second impedance comprises the second inductor winding in parallel with the third inductor winding in series connection with the fourth inductor winding;
   a third impedance comprises a first parasitic capacitor between a first switching node and ground; and
   a fourth impedance comprises a second parasitic capacitor between a second switching node and ground, a third parasitic capacitor between the output trace and ground, and the added capacitor.

4. The coupled inductor structure of claim 3, wherein the balance condition is represented by a ratio of the first impedance to the second impedance being equal to a ratio of the third impedance to the fourth impedance.

5. The coupled inductor structure of claim 1, wherein the planar winding structure comprises at least one winding layer with the first inductor winding having turns about the first leg and the second inductor winding having turns about the second leg, and at least one winding layer with the third inductor winding having turns about the first leg and the fourth inductor winding having turns about the second leg.

6. The coupled inductor structure of claim 5, wherein the planar winding structure comprises a six-layer winding structure, the six-layer winding structure comprises:
   five winding layers with the first inductor winding having a number of turns about the first leg and the second inductor winding having a number of turns about the second leg, and one winding layer with the third inductor winding having a number of turns about the first leg and the fourth inductor winding having a number of turns about the second leg.

7. The coupled inductor structure of claim 6, wherein the number of turns of the third inductor winding about the first leg is one, and the number of turns of the fourth inductor winding about the second leg is one.

8. The coupled inductor structure of claim 1, wherein the first inductor winding and the second inductor winding are configured for negative coupling.

9. The coupled inductor structure of claim 8, wherein a direct current (DC) flux generated by the first inductor winding and the second inductor winding are added in the first and second legs and the DC flux generated by the first inductor winding and the second inductor winding are subtracted in the center leg, and wherein an alternating current (AC) flux generated by the first inductor winding and the second inductor winding are subtracted in the first and second legs and the AC flux generated by the first inductor winding and the second inductor winding are added in the center leg.

10. The coupled inductor structure of claim 1, wherein the first inductor winding and the second inductor winding are configured for positive coupling.

11. The coupled inductor structure of claim 10, wherein a direct current (DC) flux generated by the first inductor winding and the second inductor winding are subtracted in the first and second legs and the DC flux generated by the first inductor winding and the second inductor winding are added in the center leg, and wherein an alternating current (AC) flux generated by the first inductor winding and the second inductor winding are added in the first and second legs and the AC flux generated by the first inductor winding and the second inductor winding are subtracted in the center leg.

12. The coupled inductor structure of claim 11, wherein the planar winding structure comprises an eight-layer winding structure, the eight-layer winding structure comprises:
  six winding layers with the first inductor winding having turns about the first leg and the second inductor winding having turns about the second leg, and
  two winding layers with the third inductor winding having a number of turns about the first leg and the fourth inductor winding having a number of turns about the second leg.

13. The coupled inductor structure of claim 12, wherein the two winding layers with the third inductor winding having a number of turns about the first leg and the fourth inductor winding having a number of turns about the second leg are in parallel to form a single turn for the third inductor winding and a single turn for the fourth inductor winding.

14. The coupled inductor structure of claim 1, wherein the magnetic core is an EI core.

15. The coupled inductor structure of claim 1, wherein the magnetic core is a PQ core.

16. The coupled inductor structure of claim 1, wherein CM noise is reduced uniformly up to 20 dB in a switching frequency range from 150 kHz to 30 MHz.

17. The coupled inductor structure of claim 1, wherein a number of turns of the third inductor winding and a number of turns of the fourth inductor winding are configured to minimize impact from a ground loop resonant.

18. The coupled inductor structure of claim 1, wherein the first inductor winding and the second inductor winding are configured for positive coupling for high power variable voltage output.

19. The coupled inductor structure of claim 1, wherein the impedance ratio is fixed up to 90 MHz.

20. A power converter comprising:
  a power factor correction (PFC) converter; and
  a coupled inductor structure, comprising:
    a magnetic core comprising a first leg, a second leg, and a center leg; and
    a planar winding structure comprising:
      a first inductor winding connected in a forward path of a first phase of the PFC converter between a first power source connection and switches of the first phase, the first inductor winding having a number of first leg turns;
      a second inductor winding connected in a forward path of a second phase of the PFC converter between the first power source connection and switches of the second phase, the second inductor winding having a number of second leg turns;
      a third inductor winding connected in a return path of the PFC converter, the third inductor winding having at least one turn interleaved within the number of first leg turns of the first inductor winding; and
      a fourth inductor winding connected in the return path, the fourth inductor winding connected in series with the third inductor winding between switches of the return path and a second power source connection, the fourth inductor winding having at least one turn interleaved within the number of second leg turns of the second inductor winding,
    wherein the first inductor winding and the third inductor winding are configured to achieve unity coupling and the second inductor winding and the fourth inductor winding are configured to achieve unity coupling.

* * * * *